United States Patent
Alegret et al.

(10) Patent No.: US 9,210,463 B2
(45) Date of Patent: Dec. 8, 2015

(54) NETWORK AUTODISCOVERY AS A LEVER TO DECORRELATED SERVICE ACTIVATION THROUGH EVENT DRIVEN ARCHITECTURE

(75) Inventors: Sebastien Alegret, Biot (FR); Olivier Brie, Biot (FR)

(73) Assignee: ACCENTURE GLOBAL SERVICES LIMITED, Dublin (IE)

(*) Notice: Subject to any disclaimer, the term of this patent is extended or adjusted under 35 U.S.C. 154(b) by 1465 days.

(21) Appl. No.: 12/605,076

(22) Filed: Oct. 23, 2009

(65) Prior Publication Data
US 2011/0058657 A1  Mar. 10, 2011

(30) Foreign Application Priority Data
Sep. 7, 2009  (EP) ..................................... 09305815

(51) Int. Cl.
| | | |
|---|---|---|
| H04M 1/24 | (2006.01) | |
| H04N 21/435 | (2011.01) | |
| H04L 29/06 | (2006.01) | |
| H04N 7/16 | (2011.01) | |
| H04N 7/173 | (2011.01) | |
| H04N 21/235 | (2011.01) | |
| H04N 21/236 | (2011.01) | |
| H04N 21/258 | (2011.01) | |
| H04N 21/266 | (2011.01) | |
| H04N 21/6334 | (2011.01) | |

(52) U.S. Cl.
CPC .............. *H04N 21/435* (2013.01); *H04L 63/08* (2013.01); *H04L 63/10* (2013.01); *H04N 7/162* (2013.01); *H04N 7/17318* (2013.01); *H04N 21/235* (2013.01); *H04N 21/23617* (2013.01); *H04N 21/25816* (2013.01); *H04N 21/26606* (2013.01); *H04N 21/63345* (2013.01)

(58) Field of Classification Search
CPC .............................. H04N 7/162; H04N 21/266
USPC .................... 725/25; 379/201.12; 370/395.21
See application file for complete search history.

(56) References Cited

U.S. PATENT DOCUMENTS 6,961,415 B2 * 11/2005 Doherty et al. ........... 379/201.12
6,996,129 B2 *  2/2006 Krause et al. ................. 370/487
7,219,124 B2 *  5/2007 Cerami et al. ................ 709/203
(Continued)

OTHER PUBLICATIONS

Extended European Search Report issued for European Patent Application No. 09305815.4, dated Feb. 9, 2010.

*Primary Examiner* — Fan Tsang
*Assistant Examiner* — Van D Huynh
(74) *Attorney, Agent, or Firm* — Brinks Gilson & Lione

(57) ABSTRACT

An autodiscovery system provides content credentials to customer premise equipment through an event-driven architecture. The autodiscovery system includes several modules for implementing the event-driven architecture, such as an autodiscovery front-end module, an autodiscovery back-end module, and a broadcast activation module. The autodiscovery system may also include a subscriber database that stores subscriber records that identify subscribers associated with a level of service, a customer premise equipment identifier, or both. The modules of the autodiscovery system may also communicate with a conditional access system that communicates the content credentials to a data carousel. When the content credentials are made available on the data carousel, the autodiscovery front-end module may notify the customer premise equipment that the content credentials are ready for retrieval from the data carousel.

20 Claims, 7 Drawing Sheets

(56) References Cited

U.S. PATENT DOCUMENTS

| | | |
|---|---|---|
| 7,778,199 B2 * | 8/2010 | Booth et al. .................. 370/254 |
| 2002/0071440 A1 * | 6/2002 | Cerami et al. ................. 370/404 |
| 2002/0108120 A1 * | 8/2002 | Bahraini et al. .............. 725/109 |
| 2003/0074246 A1 * | 4/2003 | Adams et al. ...................... 705/8 |
| 2003/0133556 A1 * | 7/2003 | Naik et al. ............... 379/201.12 |
| 2004/0190699 A1 * | 9/2004 | Doherty .............. H04L 41/0806 379/201.12 |
| 2004/0261092 A1 | 12/2004 | Addington et al. |
| 2007/0098170 A1 * | 5/2007 | Koo ....................... H04N 7/162 380/239 |
| 2008/0112328 A1 * | 5/2008 | Griffiths ........................ 370/241 |
| 2009/0047945 A1 * | 2/2009 | Zhang et al. ................... 455/424 |
| 2010/0287582 A1 * | 11/2010 | Barnett, Jr. ....................... 725/25 |
| 2011/0131625 A1 * | 6/2011 | Schlack ........................ 725/116 |
| 2011/0317588 A1 * | 12/2011 | Unbehagen et al. .......... 370/254 |
| 2011/0321113 A1 * | 12/2011 | Bahnck et al. ................ 725/131 |
| 2012/0151532 A1 * | 6/2012 | Del Sordo et al. ............. 725/59 |
| 2012/0324048 A1 * | 12/2012 | Mao et al. ..................... 709/217 |
| 2013/0064100 A1 * | 3/2013 | Bovo et al. .................... 370/241 |

* cited by examiner

NETWORK AUTODISCOVERY AS A LEVER TO DECORRELATED SERVICE ACTIVATION THROUGH EVENT DRIVEN ARCHITECTURE

BACKGROUND

1. Technical Field

This application relates to an event driven architecture and, in particular, to an event driven architecture that autodiscovers customer premise equipment and makes content credentials available to the customer premise equipment when the event driven architecture processes an autodiscovery event.

2. Related Art

In order to receive substantive content from a telecommunication service provider, customer premise equipment typically requires content credentials that authorize the customer premise equipment to receive that substantive content. The content credentials are generally issuable by a conditional access system working in conjunction with the telecommunication service provider, and the conditional access system may communicate the content credentials to a data carousel accessible by the customer premise equipment.

However, current telecommunication service providers and conditional access systems typically make the content credentials available on the data carousel at the time of purchase or rental of the customer premise equipment. That is, the telecommunication service provider and the conditional access system make the content credentials available on the data carousel at the time of subscription or purchase of the customer premises equipment. As a data carousel typically has limited storage for storing the content credentials, current conditional access systems allocate a limited time for which the content credentials are available. Current implementations lead to a waste in resources and an inefficient use of the data carousel when the customer premise equipment does not retrieve the content credentials within the allocated time (e.g., because the purchaser does not install the equipment in a timely manner after purchase). Hence, a more efficient system that provides the content credentials to the customer premise equipment is needed.

SUMMARY

An autodiscovery system provides content credentials to customer premise equipment through an event-driven architecture. In one implementation, the autodiscovery system includes a computer-readable memory storage device that stores instructions that define one or module modules. The instructions, when executed by a processor, execute the logic of the modules to implement the event-driven architecture. The modules may include an autodiscovery front-end module, an autodiscovery back-end module, and a broadcast activation module. The autodiscovery front-end module, the autodiscovery back-end module, and the broadcast activation module may include one or more additional modules. For example, the broadcast activation module may include an event receiver module and a command sending module.

The autodiscovery front-end module monitors network communications, such as network packets, sent by the customer premise equipment. In one implementation, the autodiscovery front-end module is operative to receive a network notification from customer premise equipment. The network notification may notify a telecommunication service provider that the customer premise equipment is ready to receive service. The autodiscovery front-end module may then communicate the network notification to another module of the autodiscovery system, such as the autodiscovery back-end module.

The autodiscovery back-end module processes network communications received by the autodiscovery front-end module and determines whether to generate an autodiscovery event based on the received network communications. For example, the autodiscovery back-end module may extract an unverified customer premise equipment identifier from a network communication and then generate an autodiscovery event that identifies that the customer premise equipment is not receiving service from the telecommunications service provider. The autodiscovery back-end module may generate the autodiscovery event when the autodiscovery back-end module determines that the unverified customer premise equipment identifier matches a registered customer premise equipment identifier stored in a database.

The broadcast activation module is operative to process the autodiscovery events generated by the autodiscovery back-end module using the event receiver module and the command sending module. The event receiver module is operative to receive the autodiscovery event from the autodiscovery back-end module, and the command sending module is operative to generate a request for content credentials in response to the autodiscovery event. The command sending module may communicate the request for the content credentials to a conditional access system, and the conditional access system may communicate the content credentials to a data carousel accessible by the customer premise equipment. When the content credentials are communicated to the data carousel and are available to the customer premise equipment, the autodiscovery front-end module may notify the customer premise equipment that the content credentials are available from the conditional access system, the data carousel, or both.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

DETAILED DESCRIPTION OF THE PREFERRED EMBODIMENTS

Figure 1:
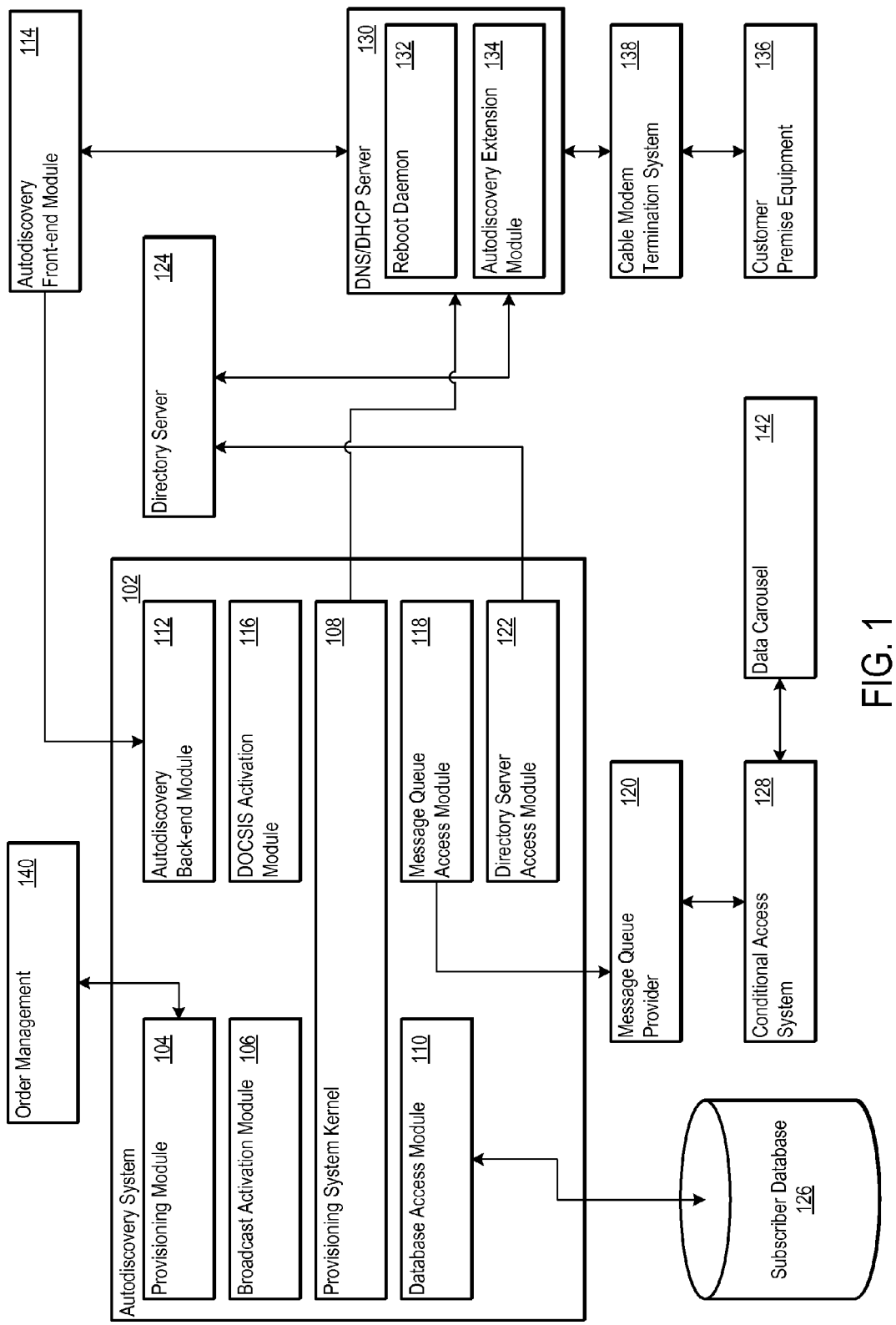
FIG. 1 shows one example of an autodiscovery system that implements an event-driven architecture.

FIG. 1 shows one example of an autodiscovery system 102 that provides content credentials to customer premise equipment through an event-driven architecture. The autodiscovery system 102 includes several modules for implementing the event-driven architecture, such as a provisioning module 104 in communication with an order management module 140, a broadcast activation module 106, a provisioning system kernel 108, and a database access module 110. The autodiscovery system 102 also includes an autodiscovery back-end module 112 in communication with an autodiscovery front-end module 114, a Date Over Cable Service Interface Specification ("DOCSIS") activation module 116, a message queue module 118 in communication with a message queue provider 120, and a directory server access module 122 in communication with a directory server 124.

The autodiscovery system 102 may also indirectly communicate with one or more components. For example, the autodiscovery system 102 may communicate with a conditional access system 124 through the message queue provider 120, and the autodiscovery system 102 may communicate with a database 126 through the database access module 110. In addition, the autodiscovery system 102 may communicate with a conditional access system 128 through a message queue provider 120, and the conditional access system 128 may communicate with a data carousel 142. As another example, the autodiscovery system 102 may communicate with a DNS/DHCP server 130 through a reboot daemon 132 and/or an autodiscovery extension module 134, and the autodiscovery system 102 may communicate with a customer premise equipment 136 through a cable modem termination system 138, the DNS/DHCP server 130, or both.

One or more of the modules shown in FIG. 1 may be implemented in hardware, software, or both. For example, the modules of the autodiscovery system 102 may be implemented as a Java-based web application running on an Apache/Tomcat platform under a Solaris operating system. Apache/Tomcat is an open source software implementation of the Java Servlet and JavaServer Pages technologies. Apache/Tomcat is available from the Apache Software Foundation, which is located in Forest Hill, Md., United States. Java, Java Servlet, and JavaServer Pages are available from Sun Microsystems, Inc. located in Santa Clara, Calif., United States. The Solaris operating system is also available from Sun Microsystems, Inc. The autodiscovery system 102 may also implement one or more messaging standards, such as the Java Message Service ("JMS") API, which is a messaging standard that allows application components to send, receive, and read messages. The JMS API is also available from Sun Microsystems, Inc. Alternatively, one or more modules shown in FIG. 1, such as the reboot daemon 132 and the autodiscovery extension module 134, may be implemented in another programming language, such as C, which was developed by Dennis Ritchie and Bell Laboratories.

The autodiscovery system 102 facilitates the distribution of content credentials to authorized customer premise equipment. The autodiscovery system 102 may require that the customer premise equipment be authorized to prevent the unauthorized distribution of network content to unauthorized customer premise equipment. Alternatively, by requiring that the customer premise equipment be authorized, a telecommunication service provider can control the type and amount of authorized customer premise equipment available to subscribers.

In one implementation, a set of customer premise equipment has a customer premise equipment identifier. The customer premise equipment identifier may be a serial number, a Media Access Control ("MAC") address, a model number, or any other type of customer premise equipment identifier that distinguishes one set of customer premise equipment from another set. The customer premise equipment identifier may be stored and associated with a subscriber record of the database 126. For example, the order management module 140 may receive a notification that a subscriber of a telecommunication service provider has recently purchased or rented a customer premise equipment for use with the telecommunication service provider. The order management module 140 may also receive a request to register the customer premise equipment identifier of the newly purchased or rented customer premise equipment with the autodiscovery system 102. The order management module 140 may communicate the request to the provisioning module 104, which may then request that the database 126 store the customer premise equipment identifier as a registered customer premise identifier. In storing the customer premise equipment identifier, the provisioning module 104 may communicate with the database access module 110 to access the database 126.

In effect, the registered customer premise equipment identifier signifies to the autodiscovery system 102 that the customer premise equipment associated with the registered customer premise identifier is authorized to receive network content from the telecommunication service provider.

In addition to the registered customer premise equipment identifier, the database 126 may store additional subscriber information. The database 126 may be any type of database, such as a relational database, a distributed database, a navigational database, an object database, or any other type of database for storing additional subscriber information. In one implementation, the database 126 is an Oracle Database 11g, which is available from the Oracle Corporation located in Redwood Shores, Calif., United States.

The database 126 may store a record for each of the subscribers of the telecommunication service provider. Table 1 below lists examples of the type of subscriber/broadcast information that the database 126 may store for a subscriber record.

TABLE 1

| Database Field | Data Type | Brief Explanation |
| --- | --- | --- |
| BROADCAST_LASTORDER | VARCHAR2(50) | The most recent provisioning action performed for the customer premise equipment. |

TABLE 1-continued

| Database Field | Data Type | Brief Explanation |
| --- | --- | --- |
| SUBSCRIBER_ACCOUNTNO | INTEGER | The account number for the subscriber. |
| BROADCAST_CLIENTTRANSREF | VARCHAR2(50) | A client transfer reference number for the telecommunication service provider. |
| SMARTCARD_NUMBER | VARCHAR2(20) | A smartcard identification number associated with the subscriber. |
| SMARTCARD_PAIRING_ID | VARCHAR2(20) | A smartcard pairing identification number associated with the subscriber. |
| BROADCAST_PIN | VARCHAR2(10) | A personal identification number associated with the subscriber. |
| BROADCAST_RETURNPATH | CHAR(1) | Specifies whether the customer premise equipment has a return path. |
| SUBSCRIBER_ZIP | VARCHAR2(10) | The postal code of the subscriber. |
| BROADCAST_IMPULSE | CHAR(1) | Identifies whether the impulse mode of the customer premise equipment is suspended. |
| BROADCAST_SERVICES | VARCHAR2(2000) | Identifies the network services available to the customer premise equipment. |
| CPE_NETWORK_NAME | VARCHAR2(256) | Identifies the network name of the customer premise equipment. |
| CPE_AUTHENTICATIONID | VARCHAR2(20) | Identifies an authentication identification number for the customer premise equipment. |
| CPE_MACADDR | VARCHAR2(100) | Identifies a MAC address for the customer premise equipment. |
| BROADCAST_SUSPENDED | CHAR(1) | Identifies whether the customer premise equipment is in a suspended state. |
| BROADCAST_CUSTOMDATA | CLOB | A block of data reserved for use by one or more provisioning systems. |
| BROADCAST_TS | TIMESTAMP | A timestamp indicator that identifies a time when a command occurred. |

In addition to the exemplary subscriber information shown in Table 1, the database 126 may also store a level of service identifier associated with a subscriber identifier. Furthermore, one or more of the database fields may correspond to the registered customer premise equipment identifier, the registered subscriber identifier, the level of service identifier, or any other identifiers recognized by the autodiscovery system 102. For example, the BROADCAST_SERVICES database field may store the level of service identifier associated with the subscriber identifier. As additional examples, the CPE_MACADDR database field or the CPE_AUTHENTICATIONID field may store the registered customer premise equipment identifier, and the SUBSCRIBER_ACCOUNTNO database field may store the subscriber identifier. Depending on the customer premise equipment, the SMARTCARD_NUMBER database field and the SMARTCARD_PAIRING_ID database field may also store the customer premise equipment identifier, the subscriber identifier, or both. Other types of subscriber information are also possible.

The subscriber identifier identifies a subscriber and the level of service identifier associated with the subscriber identifier may identify the level of service to provide to the subscriber associated with the subscriber identifier. In one implementation, a telecommunication service provider has different classes of service, and the level of service identifier identifies the class of service to provide to the subscriber. By distinguishing the levels of service between subscribers, a telecommunication service provider can retain control over the available bandwidth and incoming or outgoing network traffic. For example, the different classes of service may indicate the amount of network bandwidth available to the subscriber. Other types of classes of service are also possible.

Figure 2:
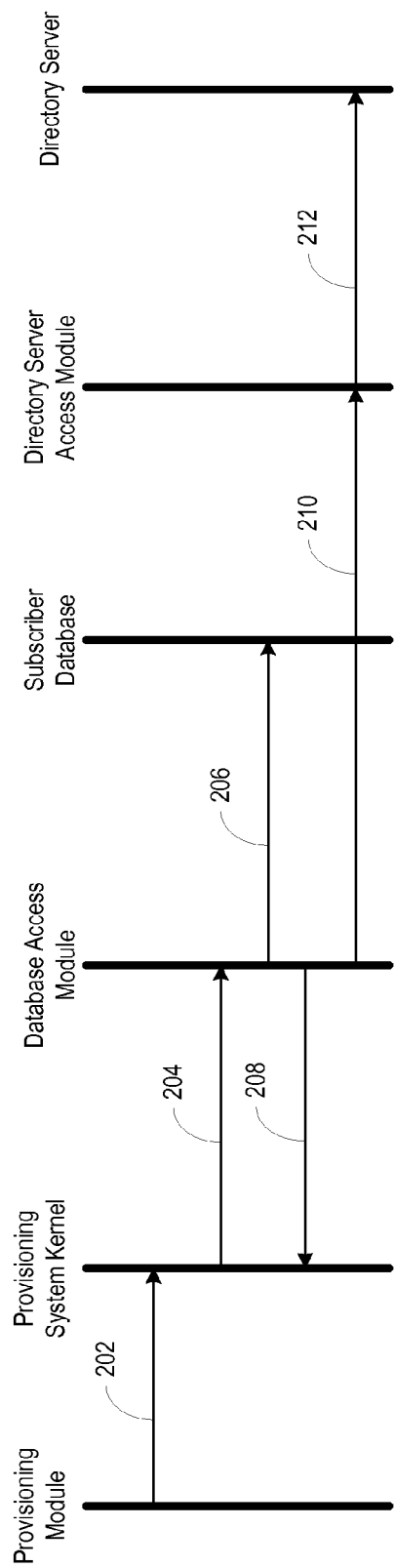
FIG. 2 shows one example of message flow for adding a new subscriber to the autodiscovery system of FIG. 1.

In an initial procedure for registering the customer premise equipment, the autodiscovery system 102 may associate the customer premise equipment identifier with the subscriber identifier, and the autodiscovery system 102 may distribute the association to one or more components in communication with the autodiscovery system 102. For example, with reference to FIG. 2, after the provisioning module 104 receives the customer premise equipment identifier from the order management module 140, the provisioning module 104 may communicate the customer premise equipment identifier and the request to register the customer premise equipment identifier to the provisioning system kernel 108 (202). The provisioning system kernel 108 may then process the request from the provisioning module 104 to determine the destination and/or component to receive the request. As the provisioning module 104 received the request to register the customer premise equipment identifier with a subscriber, the provisioning system kernel 108 will determine that the register request should be communicated to the database access module 110 (204).

The provisioning system kernel 108 may then communicate the request and customer premise equipment identifier to the database access module 110 (204). In turn, the database access module 110 may communicate with the database 126 to store the customer premise equipment identifier (208). As discussed above, storing the customer premise equipment identifier may include associating the customer premise equipment identifier with a subscriber identifier, a subscriber record, or other subscriber information stored in the database 126. By storing the customer premise equipment identifier and/or associating the customer premise equipment identifier with a subscriber identifier or subscriber record, the customer premise equipment identifier becomes a registered customer premise equipment identifier.

After storing the customer premise equipment identifier in the database 126, the database access module 110 may then communicate a registration message to the provisioning system kernel 108 that the registration of the customer premise equipment identifier was successful (208). Alternatively, the database access module 110 may communicate another message, such as a failure message indicating that the registration of the customer premise equipment identifier failed or a non-responsive message indicating that the database 126 did not respond to commands from the database access module 110. Other message types are also possible.

After the provisioning system kernel 108 receives a registration message from the database access module 110, the provisioning system kernel 108 may then communicate the registration of the customer premise equipment identifier to the directory server 124. In one implementation, the directory server 124 is a Lightweight Directory Access Protocol ("LDAP") server. The directory server 124 may store directory information about subscribers and customer premise equipment such as the association between subscribers and customer premise equipment, whether a set of customer premise equipment is registered with the autodiscovery system 102, whether a subscriber has access to the autodiscovery system 102, or other directory information. The directory server 124 servers as middle-man between the autodiscovery system 102 and the customer premise equipment that prevents overloading the autodiscovery system 102 with requests for access to directory information. Although FIG. 1 shows that the directory server 124 may be a single component, in an alternative implementation, the directory server 124 may include a master directory server and a replica directory server. In this alternative implementation, the master directory server may allow new directory information to be added to the directory, and the replica directory server may replicate the information stored in the master directory server based on a regionalised pattern. In essence, the replica directory provides segmented data, and thus smaller sample of data, to be propagated and processed by distributed subsystems. The replica directory server may also limit the type of actions that can be performed on the stored directory information, such as limiting write access, delete access, or limiting other types of access.

In communicating with the directory server 124, the provisioning system kernel 108 may communicate with the directory server access module 122. For example, the provisioning system kernel 108 may communicate the association of the registered customer premise equipment identifier and the subscriber identifier to the directory server access module 122 (210). In turn, the directory server access module 122 may communicate the association information to the directory server 124 (212).

Figure 3:
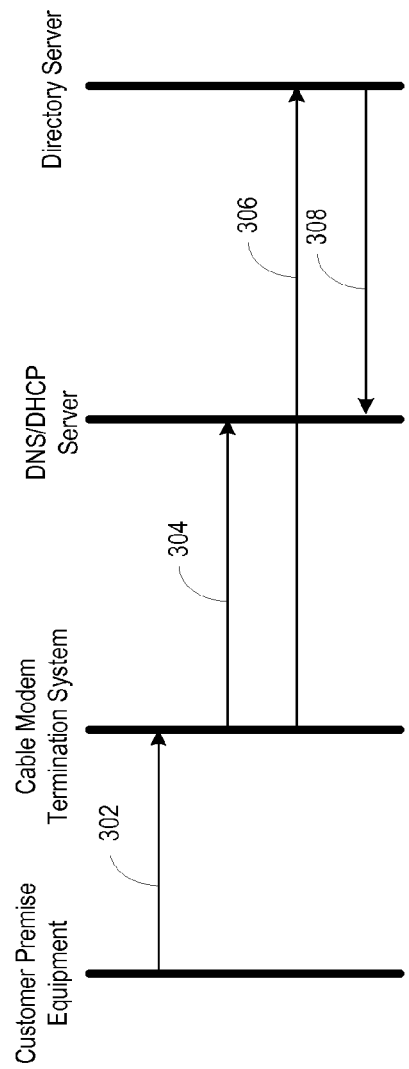
FIG. 3 shows one example of message flow when initializing customer premise equipment.

Once a set of customer premise equipment is registered with the autodiscovery system 102, the autodiscovery system 102 may then wait for the customer premise equipment to join the network of the autodiscovery system 102 and the telecommunication service provider. With reference to FIG. 3, when the customer premise equipment 136 is first powered on or otherwise connected to the network, the customer premise equipment 136 may begin an initialization procedure. In general, the customer premise equipment 136 communicates with the autodiscovery system 102 to obtain authorization that the customer premise equipment 136 should receive network services or network content from a telecommunication service provider. The customer premise equipment 136 may be any type of customer premise equipment, such as a set-top box, a cable modem, a Digital Subscriber Line ("DSL") modem, or any other type of customer premise equipment. In addition, the customer premise equipment 136 may include any of the components shown in FIG. 1, such as the cable modem termination system 138, the DNS/DHCP server 130, the directory server 124 or combinations thereof. In one implementation, the customer premise equipment 136 includes components 130-138 that are not the modules 104-122 of the autodiscovery system 102.

The initialization procedure may include establishing a level of service for the customer premise equipment 136, establishing authorization to access the network of the autodiscovery system 102, confirming the association of the customer premise equipment with a subscriber, or other initialization procedures.

In one implementation, the customer premise equipment 136 communicates with the cable modem termination system 138 to establish a level, or class, of service that the customer premise equipment 136 should receive (302). In general, a cable modem termination system 138 is equipment typically found in the headend of a telecommunication service provider and is used to provide high speed data services. In one implementation, the cable modem termination system 138 is a Cisco Universal Broadband Router with features that enable it to communicate with a Hybrid Fiber Coaxial ("HFC") Cable network via a Cisco cable modem card and is available from Cisco Systems, Inc. located in San Jose, Calif., United States. Alternative types of cable modem termination systems are also possible.

In communicating with the cable modem termination system 138, the customer premise equipment 136 may send an unverified subscriber identifier and a network notification that notifies the telecommunication service provider that the customer premise equipment is ready to receive service. Alternatively, the customer premise equipment 136 may only send the network notification or only send the unverified subscriber identifier. The unverified subscriber identifier may include subscriber information such as a username, a password, or other subscriber information. The unverified subscriber identifier may also uniquely identify the owner or renter of the customer premise equipment 136. The unverified subscriber identifier is unverified because the autodiscovery system 102 has not yet established that the entity identified by the unverified subscriber identifier is a subscriber of the telecommunication service provider.

The network notification may include an unverified customer premise equipment identifier that identifies the customer premise equipment 136. As with the registered customer premise equipment identifier, the unverified customer premise equipment identifier may include a MAC address, a serial number, a model number, or any other identifying information for the customer premise equipment 136. The unverified customer premise equipment identifier is unverified because, at the onset of the initialization procedure, the autodiscovery system 102 has not yet established that the customer premise equipment 136 is authorized to access the network services provided by the telecommunication service provider.

After receiving the network notification and unverified subscriber identifier from the customer premise equipment 136, the cable modem termination system 138 may send the network notification and the unverified subscriber identifier to the DNS/DHCP server 130 (304). In one implementation, the DNS/DHCP server 130 is a Cisco Network Registrar that provides high-performance, reliable, and scalable Domain Name System (DNS) and Dynamic Host Configuration Protocol (DHCPP) services. Cisco Network Registrar is also available from Cisco Systems, Inc.

The DNS/DHCP server 130 processes the network notification and the unverified subscriber identifier to determine that the customer premise equipment 136 is requesting access to the network services provided by the telecommunication service provider. The DNS/DHCP server 130 may communicate the network notification and the unverified subscriber identifier to the directory server 124 to determine whether the customer premise equipment 136 is authorized to access the network services provided by the telecommunication service provider (306).

When the directory server 124 first receives the network notification from the DNS/DHCP server 130, the directory server 124 may recognize that the customer premise equipment has not been previously authorized. In addition, the directory server 124 may determine that a level or class of service has not yet been established for the customer premise equipment 136. Accordingly, the directory server 124 may first confirm that the customer premise equipment 136 is authorized to receive network services from the telecommunication service provider.

In one implementation, the directory server 124 may employ a single authentication scheme to confirm that the customer premise equipment 136 should have access to the network services provided by the telecommunication service provider. In the single authentication scheme implementation, the directory server 124 may extract the unverified customer premise equipment identifier from the network notification and compare the unverified customer premise equipment identifier with each of the registered customer premise equipment identifiers stored by the directory server 124. When the unverified customer premise equipment matches any of the registered customer premise equipment identifiers, the directory server 124 may communicate an authorization confirmation to the DNS/DHCP server 130 that confirms that the customer premise equipment 136 is authorized to receive network services and/or network content from the telecommunication service provider (308).

In a second implementation, the directory server 124 may employ a dual authentication scheme to confirm that the customer premise equipment 136 should have access to the network services provided by the telecommunication service provider. In this second implementation, the directory server 124 may compare the unverified subscriber identifier with the subscriber identifier stored in the directory server 124, and where the unverified subscriber identifier matches a registered subscriber identifier, the directory server 124 may then confirm that the unverified customer premise equipment identifier matches a registered customer premise equipment identifier associated with the registered subscriber identifier. When the directory server 124 determines that the unverified customer premise equipment identifier matches a registered customer premise equipment identifier associated with a corresponding registered subscriber identifier, the directory server 124 may communicate an authorization confirmation to the DNS/DHCP server 130 that confirms that the customer premise equipment 136 is authorized to receive network services and/or network content from the telecommunication service provider (308).

In addition to the authorization confirmation messages, the directory server 124 may communicate a failure message or a denial message to the DNS/DHCP server 130. For example, where the directory server 124 is unable to confirm that the customer premise equipment 136 should be authorized to access the network services and/or network content of the telecommunication service provider, the directory server 124 may communicate a failure or denial message to the DNS/DHCP server 130 that indicates that the customer premise equipment 136 should be refused service. Hence, by preregistering a customer premise equipment identifier and/or a subscriber identifier in the database 126, the autodiscovery system 102 can quickly and effectively limit access to network services and/or network content.

Figure 4:
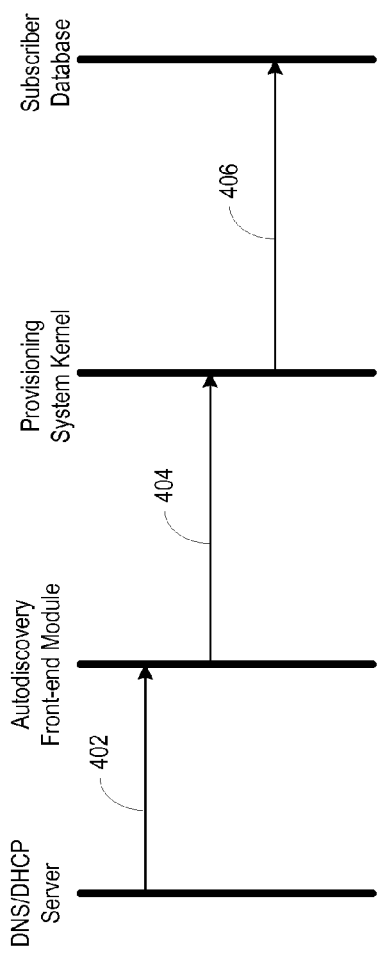
FIG. 4 shows one example of message flow for verifying customer premise equipment with the autodiscovery system of FIG. 1.

After the DNS/DHCP server 130 receives the authorization confirmation from the directory server 124, the DNS/DHCP server 130 may initiate a procedure for establishing the level or class of service to provide to the customer premise equipment 136. With reference to FIG. 4, the DNS/DHCP server 130 may communicate a network notification to the autodiscovery front-end module 114 (402). In one implementation, the DNS/DHCP server 130 includes an autodiscovery extension module 134 that handles communications with the autodiscovery front-end module 114. The autodiscovery front-end module 114 is an easily deployable module that integrates the operations of the autodiscovery system 102 with the DNS/DHCP server 130. In effect, the autodiscovery extension module 134 assists in upgrading the capabilities of a DNS/DHCP server 130 that is not configured or designed to perform the autodiscovery of the customer premise equipment 136.

In one implementation, the network notification received by the autodiscovery front-end module 114 includes a datagram formatted according to a communication protocol exchange defined by the User Datagram Protocol ("UDP"). However, the network notification may also be formatted according to other protocols, such as Internet Protocol ("IP"), the Transmission Control Protocol ("TCP"), a Voice-Over-Internet Protocol ("VoIP"), or any other communication protocol now known or later developed. In one implementation, the network notification includes a datagram or packet that signifies to the autodiscovery system 102 or the telecommunication service provider that the customer premise equipment 136 is ready to receive service from the telecommunication service provider. The network notification may also include additional datagrams or packets, such as a datagram or packet that instructs the autodiscovery system 102 to establish a level of service to provide to the customer premise equipment 136.

Once the autodiscovery front-end module 114 receives the network notification from the DNS/DHCP server 130, the autodiscovery front-end module 114 may communicate with the provisioning system kernel 108 to establish that the customer premise equipment 136 should be receiving network service and/or network content from the telecommunication service provider (404). In one implementation, the autodiscovery front-end module 114 communicates with the autodiscovery back-end module 112 to establish the level of service to provide to the customer premise equipment 136. In communicating with the autodiscovery back-end module 112, the autodiscovery front-end module 114 may send one or more parameters to the autodiscovery back-end module 112 including, but not limited to, a MAC address parameter for the MAC address of the customer premise equipment 136, an IP address parameter for the IP address of the customer premise equipment 136, an IP address parameter for the IP address of the cable modem termination system 138, an IP address parameter for the IP address of the DNS/DHCP server 130, and a class identifier for the customer premise equipment 136. Additional or other types of parameters are also possible.

The provisioning system kernel 108 may then update the subscriber record stored in the database 126 with information from one or more parameters passed by the autodiscovery front-end module 114 (406). For example, the provisioning system kernel 108 may update the subscriber record stored in the database 126 with the MAC address of the customer premise equipment 136, the IP address parameter of the customer premise equipment 136, the IP address parameter the cable modem termination system 138, the IP address of the DNS/DHCP server 130, the class identifier for the customer premise equipment 136, or any other parameter passed by the autodiscovery front-end module 114.

Figure 5:
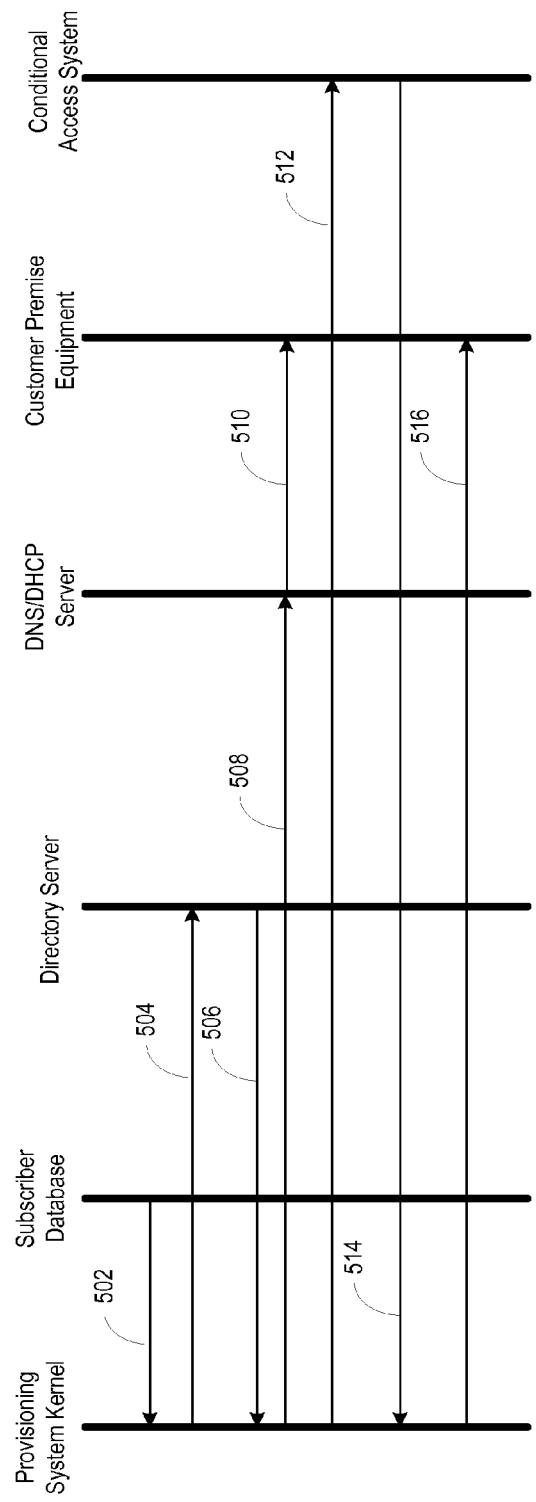
FIG. 5 shows one example of message flow for granting the customer premise equipment access to the autodiscovery system of FIG. 1.

After updating the subscriber record in the database 126, the provisioning system kernel 108 begins the updating procedure and the activation procedure for the customer premise equipment 136. With reference to FIG. 5, the provisioning system kernel 108 requests various parameters from the subscriber record stored in the database 126 for updating the directory server 124 (502). In one implementation, the provisioning system kernel 108 requests data from one or more of the parameters shown in Table 1 above. For example, the provisioning system kernel 108 may request data from the SUBSCRIBER_ACCOUNTNO database field, the BROADCAST_SERVICES database field, the CPE_AUTHENTICATIONID database field, the CPE_MACADDR database field, or any of the other database fields shown in Table 1.

The provisioning system kernel 108 then updates the directory server 124 with the data retrieved from the database 126 (504). By updating the directory server 124 with the data retrieved from the database 126, the autodiscovery system 102 can ensure that the customer premise equipment 136 is assigned its allocated level of service when the customer premise equipment 136 next communicates with the directory server 124. Hence, after an autodiscovery event occurs with the customer premise equipment 136, the autodiscovery system 102 need not directly communicate with the customer premise equipment 136 but may instead rely on the directory server 124 to properly update the customer premise equipment 136 with the proper authorization credentials, level of service identifiers, or other information. After updating the directory server 124, the directory server 124 may send an acknowledgment confirmation to the provisioning system kernel 108 that the updating procedure has completed (506). Alternatively, the directory server 124 may send another message to the provisioning system kernel 108, such as a failure message indicating that the updating procedure has failed or a non-responsive message indicating that the directory server 124 is unable to complete the updating procedure.

As discussed above with reference to FIG. 1, the directory server 124 may be implemented as a master directory server and a replica directory server. Where the directory server 124 is implemented as a master directory server and a replica directory server, the replica directory server may replicate the updated directory information stored in the master directory server. In this implementation, the master directory server may send an acknowledgement confirmation to the provisioning system kernel 108 after the replica directory server has completed replicating the updating directory information stored in the master directory server. As previously discussed, the replica directory server provides segmented data, and thus smaller sample of data, to be propagated and processed by distributed sub-systems.

After updating the directory server 124, the provisioning system kernel 108 may then instruct the DNS/DHCP server 130 to re-initialize or reboot the customer premise equipment 136 via a reboot daemon 132 stored within the DNS/DHCP server 130 (508). The reboot daemon 132 may be implemented in hardware or software and may reside on the DNS/DHCP server 130 for communicating reboot commands to the customer premise equipment 136 issued by the autodiscovery system 102. As the reboot daemon 132 is a portable module, the reboot daemon 132 assists in upgrading the capabilities of a DNS/DHCP server 130 that is not configured or designed to perform the reboot of the customer premise equipment 136. The reboot command sent to the reboot daemon 132 may include one or more reboot parameters such as the customer premise equipment identifier of the customer premise equipment 136, a location identifier of the customer premise equipment 136 or any other reboot parameter. In addition, the reboot command may be issued by one or more modules in communication with the provisioning system kernel 102, such as the DOCSIS activation module 116, the message queue access module 118, the autodiscovery front-end module 114, or any of the other modules.

Prior, or subsequent to, the reboot of the customer premise equipment 136, the provisioning system kernel 108 may activate one or more network services for the customer premise equipment 136 available from the autodiscovery system 102 or the telecommunication system provider. In one implementation, the DOCSIS activation module 116 facilitates the activation and deactivation of network services for the customer premise equipment 136. As the autodiscovery system 102 may not have direct access to the customer premise equipment 136, the DOCSIS activation module 116 may communicate with the directory server 124 for the activation and deactivation of network services for the customer premise equipment 136. In general, activation and deactivation refer to establishing network services with the customer premise equipment 136. Thus, the customer premise equipment 136 may be activated for one or more network services, such as a television network programming, but the customer premise equipment 136 may also be deactivated for one or more network services, such as Internet, telephony, or other network services. The customer premise equipment 136 may be activated or deactivated for the network services when the customer premise equipment 136 next communicates with the directory server 124 after a reboot command is issued by the reboot daemon 132.

In addition to activating and deactivating network services for the customer premise equipment 136, the DOCSIS activation module 116 may also issue commands to the directory server 124, the DNS/DHCP server 130, or the customer premise equipment 136 that affect the ability of the customer premise equipment 136 to communicate with the autodiscovery system 102 or the telecommunication service provider. For example, the DOCSIS activation module 116 may issue commands that assign or unassign an IP address to the customer premise equipment 136, reinitialize the customer premise equipment 136, reboot the customer premise equipment 136, or any other command that affects the ability of the customer premise equipment 136 to communicate with the autodiscovery system 102 or the telecommunication service provider.

Subsequent, or prior to, the customer premise equipment 136 completing the reboot procedure, the autodiscovery system 102 may communicate with a conditional access system 128 to make content credentials available to the customer premise equipment 136 (512). Thus, in response to the autodiscovery event of the customer premise equipment 136, the autodiscovery system 102 generates a request for content credentials issuable by the conditional access system 128. In general, the content credentials identify the network content receivable by the customer premise equipment 136. The request for content credentials may be sent using one or more modules such as the message queue access module 118, the broadcast activation module 106, the message queue provider 120, or any other modules of the autodiscovery system 102.

When the conditional access system 128 receives the request for content credentials, the conditional access system 128 may communicate the content credentials to a data carousel 142 accessible by the customer premise equipment 136. The autodiscovery system 102 may then confirm that the content credentials are available to the customer premise equipment 136. For example, the provisioning system kernel 108 may communicate a confirmation request to the conditional access system 128 to confirm that the content credentials are available to the customer premise equipment 136, and the provisioning system kernel 108 may await the receipt of an acknowledgement confirmation that the content credentials are available to the customer premise equipment 136. By confirming that the content credentials are available to the customer premise equipment 136, the autodiscovery system 102 ensures that the customer premise equipment 136 does not waste time and resources in attempting to receive content credentials that may not be available. In alternative implementations, the autodiscovery system 102 may not confirm that the content credentials are available on the data carousel 142.

As the request for content credentials is sent to the conditional access system 128 in response to the autodiscovery of the customer premise equipment 136, the amount of time and resources spent in provisioning the content credentials is significantly reduced. Unlike conventional systems, the transmission of the content credentials to the data carousel 142 occurs when the autodiscovery system 102 autodiscovers the customer premise equipment 136. Hence, the content credentials become available to the customer premise equipment 136 when the customer premise equipment 136 is ready to receive content credentials. Thus, the content credentials do not languish on the data carousel 142 and the limited resources of the data carousel 142 are not wasted on content credentials for other sets of customer premise equipment that are not ready to receive the content credentials.

After the content credentials are placed on the data carousel 142, the provisioning system kernel 108 may notify the customer premise equipment 136 that the content credentials are available (516). Alternatively, or in addition to, the provisioning system kernel 108, the network notification to the customer premise equipment 136 may be sent by any one of the modules of the autodiscovery system 102, such as the autodiscovery front-end module 114, the message queue access module 118, or any other module.

Figure 6:
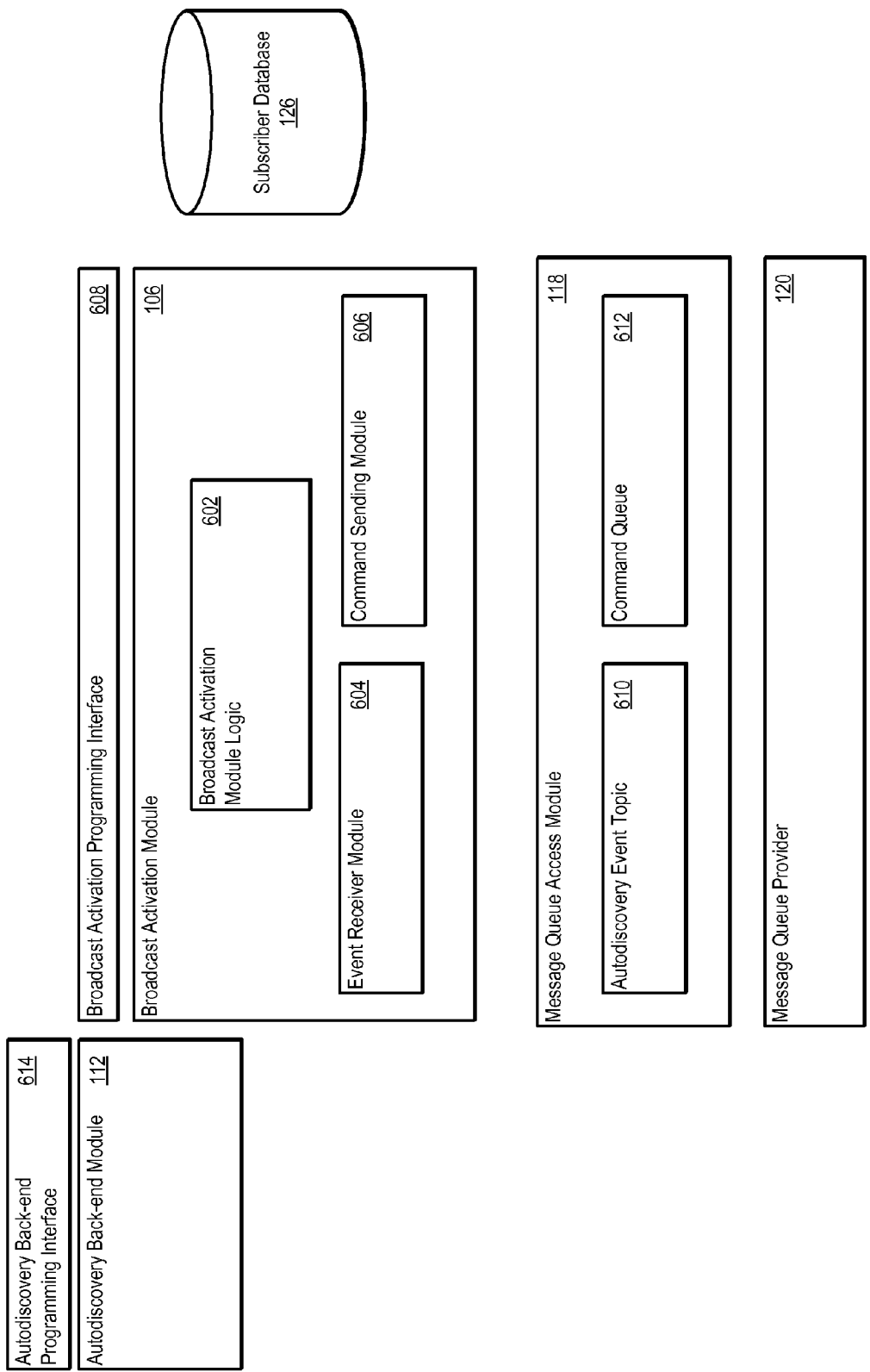
FIG. 6 shows one example of a broadcast activation module in communication with a message queue access module of the autodiscovery system of FIG. 1.

Turning next to FIG. 6 is one example of the broadcast activation module 106 in communication with a message queue access module 118 of the autodiscovery system 102 of FIG. 1. As previously discussed with reference to FIG. 1, one or more of the modules may communicate with the database 126, the message queue access module 118, the message queue provider 120, and the autodiscovery back-end module 112. For example, in performing the autodiscovery of the customer premise equipment 136, the provisioning system kernel 108 may communicate with one or more components through the broadcast activation module 106, the message access module 118, and/or the message queue provider 120.

In one implementation, the broadcast activation module 106 includes broadcast activation logic 602, an event receiver module 604, and a command sending module 606. The broadcast activation module 106 may expose a broadcast activation programming interface 608 for sending commands to the broadcast activation module 106. In one implementation, the broadcast activation programming interface 608 is implemented as part of the Java Remote Method Invocation application programming interface.

The broadcast activation module 106 is configured to receive events and send commands to the message queue access module 118. In one implementation, the message queue access module 118 includes an autodiscovery event topic 610 that receives autodiscovery events from the autodiscovery back-end module 112. The back-end module 112 may include an autodiscovery back-end programming interface 614 that receives network notifications about the autodiscovery event from the autodiscovery front-end module 114. Like the broadcast activation programming interface 608, the autodiscovery back-end programming interface 614 may be implemented as part of the Java Remote Method Invocation application programming interface.

The message queue access module 118 notifies the broadcast activation module 106 when new customer premise equipment 136 is autodiscovered by the autodiscovery system 102 via the autodiscovery event topic 610. For example, the autodiscovery event topic 610 may post the autodiscovery event to the event receiver module 604. In turn, the broadcast activation module logic 602 may process the autodiscovery event and perform one or more operations in response to the autodiscovery event. For example, as discussed with reference to the updating procedure of the database 126, the broadcast activation module logic 602 may update a subscriber record stored in the database 126 with data received as part of the autodiscovery event.

The message queue access module 118 is also configured to disseminate commands from the broadcast activation module 106 to one or more modules of the autodiscovery system 102 or one or more components in communication with the autodiscovery system 102. For example, the message queue access module 118 may include a broadcast command queue 612 for receiving commands from the command sending module 606. As explained below, the commands sent by the command sending module 606 may control the availability of network services for the customer premise equipment 136.

Figure 7:
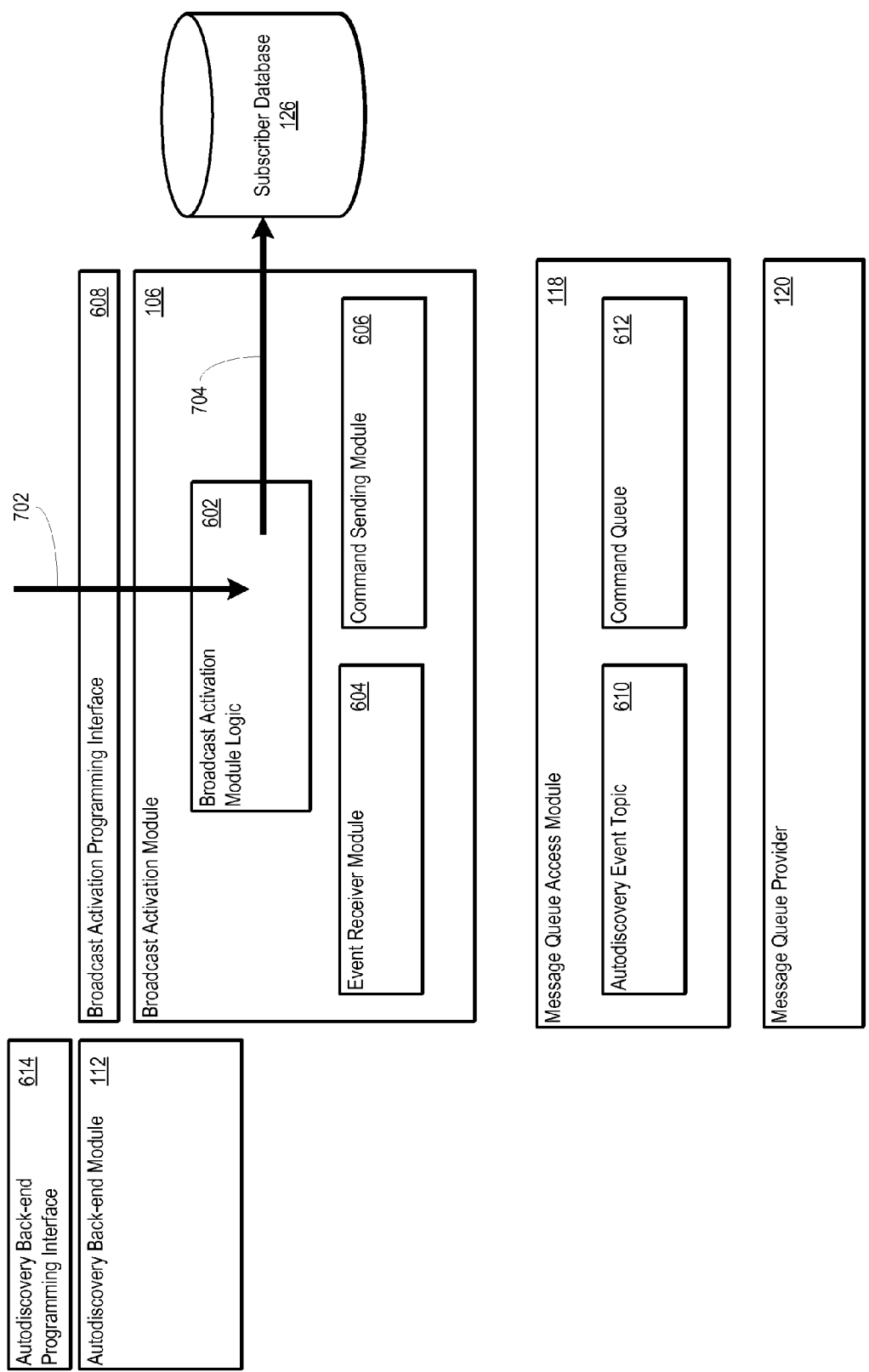
FIG. 7 shows one example of a message flow for entering data into a database using the broadcast activation module of FIG. 6.

FIG. 7 shows one example of a message flow for entering data into the database 126 using the broadcast activation module 106. Entering data into the database 126 may include updating a subscriber record for a subscriber or adding a new subscriber record to the database 126. In one implementation, the broadcast activation module 106 enters data into the database 126 in response to an install command received by the broadcast activation programming interface 608 (702). The install command may instruct the broadcast activation module logic 602 to enter or update data in the database 126 for a subscriber record (704). For example, the install command may include data for any one of the database fields shown in Table 1. Moreover, the broadcast activation module logic 602 may enter or update data stored in the database 126 in response to a command received by the broadcast activation programming interface 608 during one or more procedures, such as during the initial procedure for registering the customer premise equipment 136, during the updating procedure for a subscriber record, during the updating procedure for the customer premise equipment 136, during the activation procedure for the customer premise equipment 136, or any other procedure performed by the autodiscovery system 102.

Figure 8:
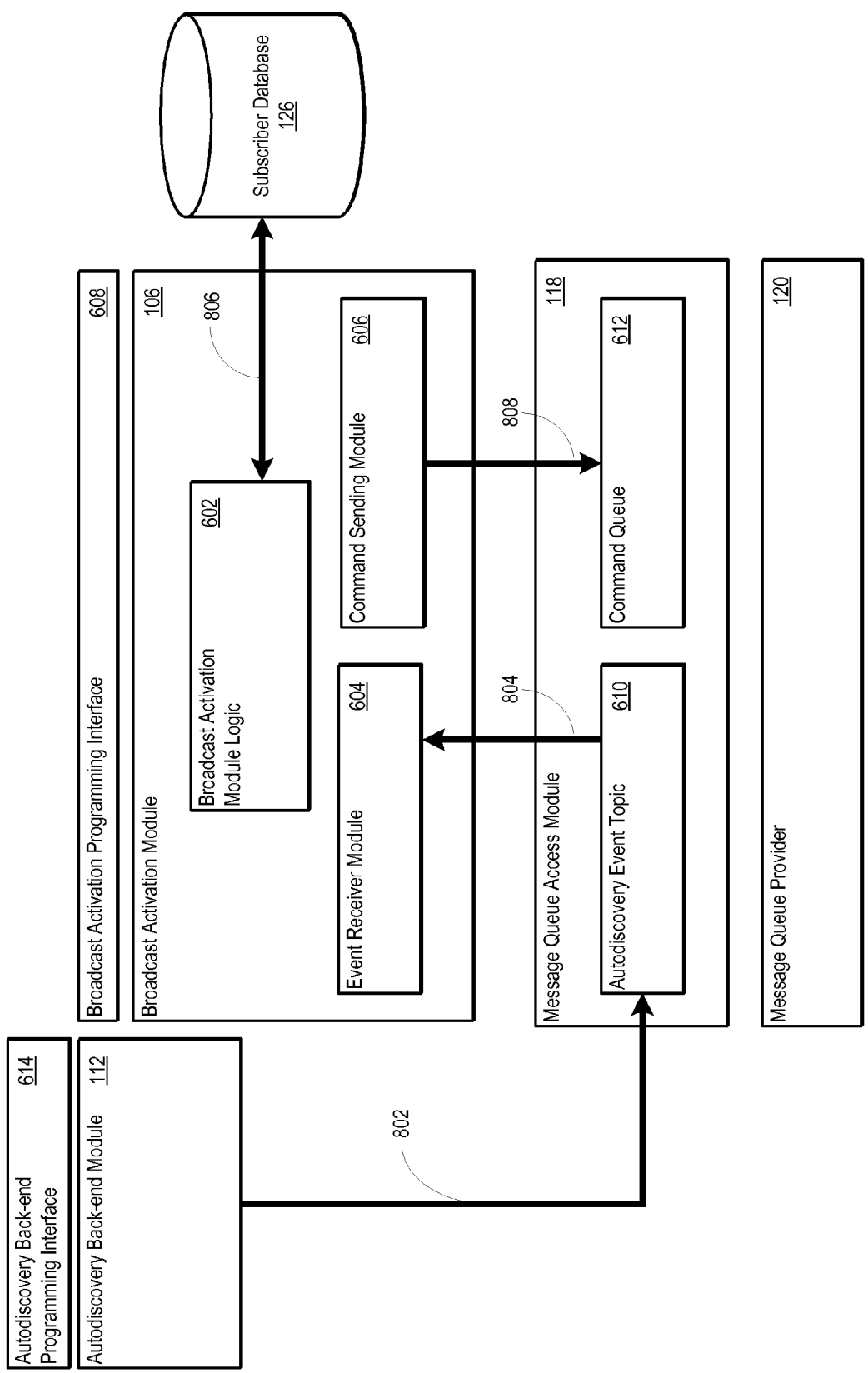
FIG. 8 shows one example of a message flow for an autodiscovery event using the broadcast activation module FIG. 6.

FIG. 8 shows one example of a message flow for an autodiscovery event using the broadcast activation module 106. Initially, the autodiscovery back-end module 112 may communicate an autodiscovery event to the autodiscovery event topic 610 (802). The autodiscovery event topic 610 then notifies the event receiver module 604 that an autodiscovery event has been received (804). In response to the receipt of the autodiscovery event, the broadcast activation module logic 602 may update a subscriber record stored in the database 126. For example, and as previously discussed with reference to FIG. 1, the broadcast activation module logic 602 may update the subscriber record stored in the database 126 with the MAC address of the customer premise equipment 136, the IP address parameter of the customer premise equipment 136, the IP address parameter the cable modem termination system 138, the IP address of the DNS/DHCP server 130, the class identifier for the customer premise equipment 136, or any other parameter accompanied with the autodiscovery event.

After updating the subscriber record in the database 126, the broadcast activation module logic 602 may request various parameters from the subscriber record stored in the database 126 for updating the directory server 124 (804). In one implementation, the broadcast activation module logic 602 requests data from one or more of the parameters shown in Table 1. For example, the broadcast activation module logic 602 may request data from the SUBSCRIBER_ACCOUNTNO database field, the BROADCAST_SERVICES database field, the CPE_AUTHENTICATIONID database field, the CPE_MACADDR database field, or any of the other database fields shown in Table 1. The broadcast activation module logic 602 may then communicate the requested parameters to the broadcast command queue 612 (808). In turn, the message queue access module 118 may process the parameters received by the broadcast command queue 612 for communicating the parameters to the provisioning system kernel 108, the directory server 124, or another module or component in communication with the autodiscovery system 102.

Between the time that a subscriber record is initially established in the database 126 and the autodiscovery event shown in FIG. 8, data in or more of the database fields of Table 1 may be changeable. The data in or more of the subscriber fields may be changed to reflect updates to a subscriber or a subscriber record. Table 2 below lists the database fields and identifies whether the data stored in the database fields is changeable between the initial install command the autodiscovery event.

TABLE 2

| Database Field | Changeable |
|---|---|
| SUBSCRIBER_ACCOUNTNO | Yes |
| BROADCAST_CLIENTTRANSREF | No |
| SMARTCARD_NUMBER | Yes |
| SMARTCARD_PAIRING_ID | Yes |
| BROADCAST_PIN | Yes |
| BROADCAST_RETURNPATH | Yes |
| SUBSCRIBER_ZIP | Yes |
| BROADCAST_IMPULSE | Yes |
| BROADCAST_SERVICES | Yes |
| CPE_NETWORK_NAME | Yes |
| CPE_AUTHENTICATIONID | Yes |
| CPE_MACADDR | Yes |
| BROADCAST_SUSPENDED | Yes |
| BROADCAST_CUSTOMDATA | No |

Figure 9:
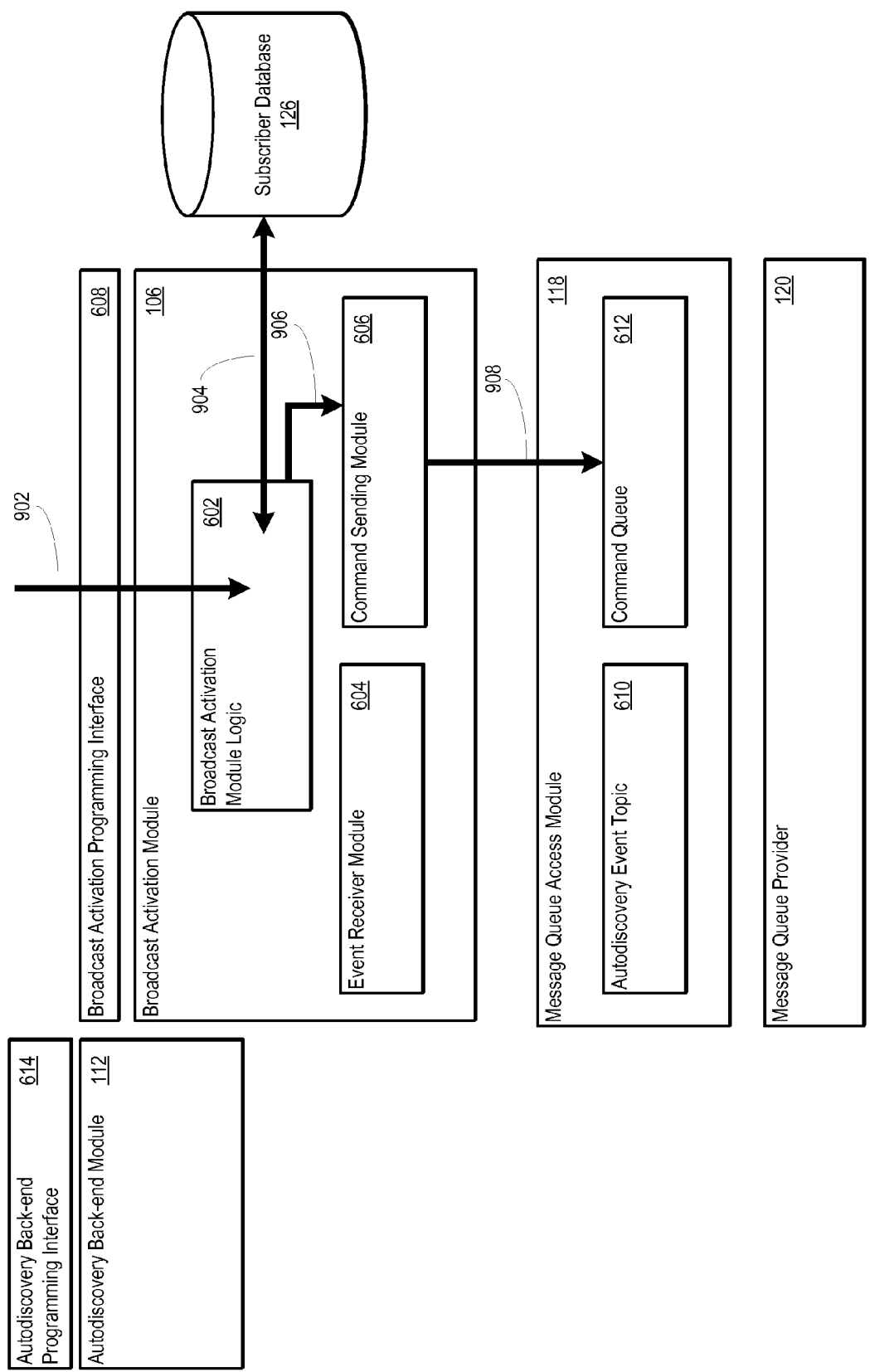
FIG. 9 shows one example of a message flow for issuing alternative commands within the autodiscovery system using the broadcast activation module of FIG. 6.

FIG. 9 shows one example of a message flow for issuing alternative commands within the autodiscovery system 102 using the broadcast activation module 106. In this message flow, the broadcast activation module 106 receives a direct command from the provisioning system kernel 108 via the broadcast activation programming interface 608 (902). The broadcast activation module 106 then communicates with the database 126 to retrieve information from the database 126 related to the customer premise equipment status, such as whether the customer premise equipment 136 has been autodiscovered, whether the customer premise equipment 136 is activated, whether the customer premise equipment 136 is suspended, or other status information (904). The broadcast activation module logic 602 then communicates the command received by the broadcast activation programming interface 608, along with the information retrieved by the database 126, to the command sending module 606 (906). Once the command and subscriber data is received, the command sending module 606 then communicates the command to the broadcast command queue 612 for further processing and communication by the message queue access module 118. For example, the message queue access module 118 may communicate the command, along with the subscriber data, to the message queue provider 120, which may then communicate the command and subscriber data to the conditional access system 128.

The broadcast activation module 106 may also be configured to handle exceptional circumstances that occur during the installation of the customer premise equipment 136. In one circumstance, a forced installation command is sent to the broadcast activation module 106 before the broadcast activation module 106 receives an autodiscovery event for the customer premise equipment 136. In this forced installation command circumstance, the forced installation command is communicated to the provisioning system kernel 108 and any pending installation commands are cleared. In other circumstance, the customer premise equipment 136 is disconnected from the network, and the broadcast activation module 106 receives notification of the disconnection prior to the autodiscovery of the customer premise equipment 136. In this disconnection circumstance, then the broadcast activation module 106 may clear the installation data for the customer premise equipment 136 and the broadcast activation module 106 may not broadcast information about the customer premise equipment 136 if, or when, the customer premise equipment 136 is later autodiscovered. Other exceptional circumstances are also possible.

In exposing the broadcast activation programming interface 608, the broadcast activation module 106 may make available a broadcast activation method for passing commands. The broadcast activation method may have one or more parameters including a session identification number parameter for identifying the session during which the command is passed, a customer premise equipment identifier, a command code that identifies the command, a listing of database parameters, and/or a listing of optional parameters. The listing of the database parameters may include one or more database parameters shown in Table 1. Table 3 below lists various commands that may be passed in the command code parameter of the broadcast activation method. Alternative command codes are also possible.

TABLE 3

| Command Code | Brief Explanation |
| --- | --- |
| INSTALL | Identifies that the command is an install command for adding a new subscriber record or customer premise equipment information to the database. |
| SERVICE_CHANGE | Identifies that the command changes a network service provided to the customer premise equipment. |
| SUSPEND_SERVICE | Identifies that the command is to suspend network service to the customer premise equipment. |
| SERVICE_ENABLED | Identifies that the command is to enable network service to the customer premise equipment. |
| DISCONNET | Identifies that the customer premise equipment should be disconnected from the network. |
| SERVICE_REFRESH | Identifies that the network services should be refreshed for the customer premise equipment. |
| PIN_RESET | Identifies that the personal identification number for the subscriber should be reset. |
| MANUAL_INSTALL | Identifies that the installation of the customer premise equipment is to be a manual installation. |
| REQUEST_CALLBACK | Identifies that a callback is requested. |
| NETWORKID_UPDATE | Identifies that the network identification of the customer premise equipment is to be updated. |
| CUSTOM | Identifies that the command contains custom data. |
| IMPULSE_INITALISE | Identifies that a network impulse service should be initialized for the customer premise equipment. |

In communicating commands to the command queue 612, the broadcast activation module 106 may communicate the commands in an Extensible Markup Language ("XML") format. Moreover, the message queue access module 118 may further format the commands from the broadcast activation module 106 to be configured as a Java Message Service text message. Other command formats or message types are also possible. For example, the commands may be formatted as a map message, a bytes message, a stream message, or any other message type now known or later developed. Below is one example of a command formatted by the broadcast activation module 106 for sending to the broadcast command queue 612:

```
<?xml version="1.0" encoding="UTF-8"?>
<NDPETransaction>
    <ProvisioningAction>INSTALL</ProvisioningAction>
    <AccountNumber>934521201</AccountNumber>
    <ClientTransRef>02014523654</ClientTransRef>
    <SmartCard pairingID="1043658563">0749856274</SmartCard>
    <PIN>1234</PIN>
    <ReturnPath>true</ReturnPath>
    <PostCode>BD11 9PW</PostCode>
    <Impulse suspended="true" />
    <Services>
        <Service>D2STD</Service>
        <Service>D2MAX</Service>
        <Service>D2SP1</Service>
        <Service>D2SP2</Service>
        <Service>D2MOV</Service>
    </Services>
    <Custom>
        <Property name="Site" value="20"/>
        <Property name="STBnetworkID" value="A08A" />
        <Property name="STBSerialNo" value="PAWOSA0004578549" />
        <Property name="MACAddress" value="004E36AF26BA" />
    </Custom>
</NDPETransaction>
```

The systems, components, and logic described above may be implemented in many different ways, including a combination of hardware and software, or as software for installation on any desired operating system including Solaris, Linux, Unix, or Windows. The functionality may be implemented in a single system or functionally partitioned across multiple systems. As another example, the components, systems, and logic may be implemented as computer-executable instructions or as data structures in memory and may be stored on, distributed across, or read from many different types of machine-readable media. The machine-readable media may include RAM, ROM, hard disks, floppy disks, CD-ROMs, flash memory or other machine-readable medium. The components, systems and logic may also be encoded in a signal, such as a signal received from a network or partitioned into sections and received in multiple packets communicated across a network. The systems may be implemented in software, hardware, or a combination of software and hardware.

Furthermore, the systems may be implemented with additional, different, or fewer components. As one example, a processor or any other logic or component may be implemented with a microprocessor, a microcontroller, a digital signal processor ("DSP"), an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

The transport layer between components and systems such as between the autodiscovery system 102, the directory server 124, the DNS/DHCP server 130, or other components may include Transport Control Protocol (TCP), Real Time Transport Protocol (RTP) or other transport logic. The network layer may route information based on Internet Protocol v4, v6 (i.e., IPv4 or IPv6) or other network layer protocols. The data link layer may include wired or wireless links, such as IEEE 802.11, WiFi, WiMAX, Asynchronous Transfer Mode (ATM), Fiber Distributed Data Interface (FDDI), Ethernet, or other data link layers over optical fiber, coaxial cable, twisted pair or other physical layers.

Interfaces between the systems and the logic and modules within systems may be implemented in numerous ways. For example, interfaces between systems may be Web Services, Simple Object Access Protocol, Enterprise Service Bus interfaces, Java Remote Method Invocation interfaces, or any other interface now known or later developed. Other examples of interfaces include message passing, such as publish/subscribe messaging, shared memory, and remote procedure calls.

The hardware and software platforms used in the autodiscovery system 102, the DNS/DHCP server 130, the directory server 124, the customer premise equipment 136, or any other component, may vary widely. As examples, the endpoints may run the Solaris operating system, the Cisco Broadband Operating System, the Cisco Catalyst Operating System, the Java Enterprise Edition 5 platform, or any other operating system or platform now known or later developed. The hardware platforms may be implemented with a general purpose processing platform, such as those available from Sun Microsystems, Hewlett Packard, or International Business Machines and running Solaris, Unix, Windows™, Linux or other operating systems.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. An autodiscovery method for providing content credentials to a customer premise equipment, comprising:
   receiving, by an autodiscovery front-end module, a network notification from a customer premise equipment that notifies a telecommunication service provider that the customer premise equipment is ready to receive service from the telecommunication service provider, wherein the network notification includes a customer premise equipment identifier that identifies the customer premise equipment, wherein at a time of receipt of the network notification, the customer premise equipment identifier has yet to be verified by the telecommunication service provider;
   extracting the unverified customer premise equipment identifier from the network notification;
   in response to receiving the network notification, generating, by an autodiscovery back-end module, an autodiscovery event that identifies that the customer premise equipment is not receiving service from the telecommunication service provider;
   receiving, by an event receiver module, the autodiscovery event;
   in response to the autodiscovery event, generating, by a command sending module, a request for content credentials issuable by a conditional access system, wherein the content credentials identify network content receivable by the customer premise equipment from the telecommunication service provider; and
   notifying, by the autodiscovery front-end module, the customer premise equipment that the content credentials are available from the conditional access system.

2. The method of claim 1, further comprising:
   storing a registered customer premise equipment identifier in a subscriber database, wherein the registered customer premise equipment identifier identifies that the customer premise equipment is registered with the telecommunication service provider;
   comparing the unverified customer premise equipment identifier from the network notification with the registered customer premise equipment identifier; and
   wherein:
   generating the autodiscovery event comprises generating the autodiscovery event when the unverified customer premise equipment identifier matches the registered customer premise equipment identifier.

3. The method of claim 2, further comprising:
   associating a level of service to provide to the customer premise equipment with the registered customer premise equipment identifier; and,
   providing the level of service to the customer premise equipment when the unverified customer premise equipment identifier matches the registered customer premise equipment identifier.

4. The method of claim 1, further comprising:
   communicating the content credentials to a data carousel accessible by the customer premise equipment; and
   wherein notifying the customer premise equipment comprises notifying the customer premise equipment after the content credentials have been communicated to the data carousel.

5. The method of claim 4, further comprising:
   communicating a confirmation request to the conditional access system to confirm that the content credentials are available to the customer premise equipment; and,
   receiving an acknowledgement confirmation that the content credentials are available to the customer premise equipment; and,
   wherein notifying the customer premise equipment comprises notifying the customer premise equipment after receiving the acknowledgement confirmation.

6. The method of claim 1, further comprising:
   in response to generating the autodiscovery event, identifying a level of service to provide to the customer premise equipment;
   communicating the level of service to provide to the customer premise equipment to a directory server accessible by the customer premise equipment; and
   providing service to the customer premise equipment according to the level of service.

7. The method of claim 1, wherein the network notification comprises a datagram formatted according to a communication protocol exchange defined by a User Datagram Protocol.

8. An autodiscovery system that provides content credentials to a customer premise equipment, comprising:
   a processor;
   a non-transitory computer-readable memory storage device that stores instructions which, when executed by a processor, define:
      an autodiscovery front-end module operative to:
         receive a network notification from a customer premise equipment that notifies a telecommunication service provider that the customer premise equipment is ready to receive service from the telecommunication service provider;
      an autodiscovery back-end module operative to:
         generate an autodiscovery event that identifies that the customer premise equipment is not receiving service from the telecommunication service provider in response to the network notification received by the autodiscovery front-end module;
      a broadcast activation module operative to process an autodiscovery event comprising:
         an event receiver module operative to receive the autodiscovery event; and a command sending module operative to generate a request for content credentials in response to the autodiscovery event, wherein:
the content credentials are issuable by a conditional access system; and,
the content credentials identify network content receivable by the customer premise equipment from the telecommunication service provider; and,
wherein the autodiscovery front-end module is further operative to notify the customer premise equipment that the content credentials are available from the conditional access system.

9. The system of claim 8, wherein the instructions further define:
a subscriber database operative to store a subscriber record associated with a registered customer premise equipment identifier that identifies the customer premise equipment is registered with the telecommunications service provider; and wherein,
the network notification comprises an unverified customer premise equipment identifier identifies the customer premise equipment; and,
the autodiscovery back-end module is further operative to:
generate the autodiscovery event when the unverified customer premise equipment identifier matches the registered customer premise equipment identifier.

10. The system of claim 9, wherein:
the subscriber database is further operative to store a level of service identifier that identifies a level of service to provide to the customer premise equipment; and,
the level of service identifier is communicated to the customer premise equipment when the unverified customer premise equipment identifier matches the registered customer premise equipment identifier.

11. The system of claim 8, further comprising:
a data carousel accessible by the customer premise equipment operative to provide the content credentials to the customer premise equipment; and
the autodiscovery front-end module is further operative to notify the customer premise equipment after the content credentials have been communicated to the data carousel.

12. The system of claim 11, wherein:
the autodiscovery front-end module is further operative to notify the customer premise equipment that the content credentials are available after the broadcast activation module has received an acknowledgement confirmation that the content credentials are available.

13. The system of claim 8, wherein:
the broadcast activation module is further operative to identify a level of service to provide to the customer premise equipment in response to the autodiscovery event; and
further comprising:
a directory server operative to:
receive a level of service identifier that identifies the level of service to provide to the customer premise equipment; and
communicate the level of service to the customer premise equipment.

14. The system of claim 8, wherein the network notification is a datagram formatted according to a communication protocol exchange defined by a User Datagram Protocol.

15. A non-transitory computer readable medium having computer-executable instructions stored thereon, the computer-executable instructions that, when executed by a computer processor, cause an autodiscovery system to perform a method comprising:
receiving, by an autodiscovery front-end module, a network notification from a customer premise equipment that notifies a telecommunication service provider that the customer premise equipment is ready to receive service from the telecommunication service provider, wherein the network notification includes a customer premise equipment identifier that identifies the customer premise equipment, wherein at a time of receipt of the network notification the customer premise equipment identifier has yet to be verified by the telecommunication service provider;
extracting the unverified customer premise equipment identifier from the network notification;
in response to receiving the network notification, generating, by an autodiscovery back-end module, an autodiscovery event that identifies that the customer premise equipment is not receiving service from the telecommunication service provider;
receiving, by an event receiver module, the autodiscovery event;
in response to the autodiscovery event, generating, by a command sending module, a request for content credentials issuable by a conditional access system, wherein the content credentials identify network content receivable by the customer premise equipment from the telecommunication service provider; and
notifying, by the autodiscovery front-end module, the customer premise equipment that the content credentials are available from the conditional access system.

16. The computer readable medium of claim 15, wherein the method further comprises:
storing a registered customer premise equipment identifier in a subscriber database, wherein the registered customer premise equipment identifier identifies that the customer premise equipment is registered with the telecommunication service provider;
comparing the unverified customer premise equipment identifier from the network notification with the registered customer premise equipment identifier; and wherein:
generating the autodiscovery event comprises generating the autodiscovery event when the unverified customer premise equipment identifier matches the registered customer premise equipment identifier.

17. The computer readable medium of claim 16 wherein the method further comprises:
associating a level of service to provide to the customer premise equipment with the registered customer premise equipment identifier; and,
providing the level of service to the customer premise equipment when the unverified customer premise equipment identifier matches the registered customer premise equipment identifier.

18. The computer readable medium of claim 15, wherein: the method further comprises:
communicating the content credentials to a data carousel accessible by the customer premise equipment; and
notifying the customer premise equipment comprises notifying the customer premise equipment after the content credentials have been communicated to the data carousel.

19. The computer readable medium of claim 18, wherein:
the method further comprises:
- communicating a confirmation request to the conditional access system to confirm that the content credentials are available to the customer premise equipment; and,
- receiving an acknowledgement confirmation that the content credentials are available to the customer premise equipment; and,
- notifying the customer premise equipment comprises notifying the customer premise equipment after receiving the acknowledgement confirmation.

20. The computer readable medium of claim 15, wherein the method further comprises:
- in response to generating the autodiscovery event, identifying a level of service to provide to the customer premise equipment;
- communicating the level of service to provide to the customer premise equipment to a directory server accessible by the customer premise equipment; and
- providing service to the customer premise equipment according to the level of service.

\* \* \* \* \*